(12) United States Patent
Yonemoto et al.

(10) Patent No.: US 11,145,858 B2
(45) Date of Patent: Oct. 12, 2021

(54) CATHODE ACTIVE MATERIAL AND LITHIUM ION ELECTROCHEMICAL SYSTEM INCLUDING THE SAME

(71) Applicant: Microvast Power Systems Co., Ltd., Zhejiang (CN)

(72) Inventors: Bryan T. Yonemoto, Clearwater, FL (US); Karima Lasri, Orlando, FL (US); Xiao Zhang, Zhejiang (CN)

(73) Assignee: Microvast Power Systems Co., Ltd., Huzhou (CN)

( * ) Notice: Subject to any disclaimer, the term of this patent is extended or adjusted under 35 U.S.C. 154(b) by 0 days.

(21) Appl. No.: 16/746,874

(22) Filed: Jan. 19, 2020

(65) Prior Publication Data

US 2021/0159487 A1   May 27, 2021

(30) Foreign Application Priority Data

Nov. 22, 2019   (CN) .......................... 201911159640.6

(51) Int. Cl.
*H01M 4/36*       (2006.01)
*H01M 4/505*      (2010.01)
*H01M 10/0525*    (2010.01)
*H01M 4/525*      (2010.01)
*H01M 4/02*       (2006.01)

(52) U.S. Cl.
CPC ........... *H01M 4/364* (2013.01); *H01M 4/505* (2013.01); *H01M 4/525* (2013.01); *H01M 10/0525* (2013.01); *H01M 2004/028* (2013.01)

(58) Field of Classification Search
CPC ...... H01M 4/364; H01M 4/505; H01M 4/525; H01M 10/0525; H01M 2004/028
See application file for complete search history.

(56) References Cited

U.S. PATENT DOCUMENTS

| 6,660,432 B2 * | 12/2003 | Paulsen ................. | H01M 4/131 |
| | | | 429/231.3 |
| 2015/0104706 A1 * | 4/2015 | Wu ........................ | H01M 4/505 |
| | | | 429/220 |
| 2020/0119349 A1 * | 4/2020 | Yonemoto ............. | H01M 4/505 |

* cited by examiner

*Primary Examiner* — Andrew J. Oyer
(74) *Attorney, Agent, or Firm* — Gang Yu (57) ABSTRACT

The present disclosure provides a cathode active material and a lithium ion electrochemical system including the same. A general formula of the cathode active material is as follows: $z\{xLi_2MnO_3*(1-x)LiRO_2\}*(1-z) Li_aR'_{1-a}O_y$, herein R and R' independently include one or more metal ions, an oxidation valence state of the R is $3^+$, and an oxidation valence state of the R' is $2^+$, herein, $0 \le x \le 0.25$, $0 < a \le 0.75$, $0.625 \le y \le 1$, $0.75 \le z < 1$.

10 Claims, 7 Drawing Sheets

CATHODE ACTIVE MATERIAL AND LITHIUM ION ELECTROCHEMICAL SYSTEM INCLUDING THE SAME

TECHNICAL FIELD

The present disclosure relates to the technical field of electrochemistry, and in particular to a cathode active material and a lithium ion electrochemical system including the same.

BACKGROUND

A lithium-ion battery, originally commercialized in the early 1990s, has come to dominate the energy storage market for hand held electronic consumer devices. This is because the battery is rechargeable, and has high mass and volume energy density. Now lithium-ion batteries are also being extensively investigated for electric vehicle applications. In the field of electric vehicles, an ideal battery cathode will have the characteristics of high capacity, high power, improved safety, long cycle life, low toxicity and lower production cost and the like. However, cathode materials are unable to meet all these requirements generally.

Applied to automobiles in particular, the ideal battery cathode needs to provide high energy density for the battery. Nowadays, layered transition metal oxides are generally used as the cathode material, especially Ni, Mn, Co (NMC) and Ni, Co, Al (NCA) compounds which have the stronger competitive power in the aspect of the energy density compared with an original $LiCoO_2$ (LCO) cathode. However, the cathode material may generate decomposition in charging-discharging processes of the battery, and a decomposition process may be accompanied with release of oxygen, thereby the performance of the battery is affected.

In addition, because of a high price of Co, the cost is remarkably improved. Recently, there has been increasing concern about cobalt in the battery cathode since its world reserves are limited and the cost is continuing to climb as electric vehicle sales increase. New cathode structures for lithium-ion batteries that do not rely on the cobalt or any other high cost inelastic metal are necessary to be developed, so it is beneficial to mass production.

SUMMARY

The main object of the present disclosure is to provide a cathode active material and a lithium ion electrochemical system including the same, an oxygen release amount, in a battery charging-discharging cyclic process, of the cathode active material in a related art may be reduced, thereby performance of a battery is improved.

In order to realize the above purpose, in accordance with one aspect of the present disclosure, a cathode active material is provided, and a general formula thereof is as follows: $z\{xLi_2MnO_3*(1-x)LiRO_2\}*(1-z) Li_aR'_{1-a}O_y$, herein R and R' independently include one or more metal ions, an oxidation valence state of the R is $3^+$, and an oxidation valence state of the R' is $2^+$, herein, $0 \le x \le 0.25$, $0 < a \le 0.75$, $0.625 \le y \le 1$, $0.75 \le z < 1$.

Further, the R is independently selected from one or more of a group consist of Al, Fe, Nb, Ni, Co and Zr, the R' is independently selected from one or more of a group consist of Ni, Mn, Co, Mg, Nb, Fe, Zn, Ti and Cu.

Further, $Li_2MnO_3$ is defined as a first phase, $LiRO_2$ is defined as a second phase, and $Li_aR'_{1-a}O_y$ is defined as a third phase, total molar content of Mn in the first phase, R in the second phase and R' in the third phase is TM, the R and/or the R' includes an element Co, and a molar content ratio of the element Co and the TM is less than or equal to 0.1.

Further, the molar content ratio of the element Co and the TM is less than or equal to 0.05.

Further, the molar content ratio of the element Co and the TM is 0.

Further, the $Li_2MnO_3$ is defined as a first phase, the $LiRO_2$ is defined as a second phase, and the $Li_aR'_{1-a}O_y$ is defined as a third phase, the total molar content of the Mn in the first phase, the R in the second phase and the R' in the third phase is a TM, in the cathode active material, a molar content ratio of an element Li and the TM is greater than or equal to 0.75.

Further, the molar content ratio of the element Li and the Tm is less than 1.5, and greater than or equal to 1.05.

Further, the $Li_2MnO_3$ is defined as a first phase, the $LiRO_2$ is defined as a second phase, and the $Li_aR'_{1-a}O_y$ is defined as a third phase, the total molar content of the Mn in the first phase, the R in the second phase and the R' in the third phase is a TM, the R and/or the R' contains an element Ni, and a molar content ratio of the Ni and the TM is less than or equal to 0.85, and greater than or equal to 0.25.

Further, the molar content ratio of the element Ni and the TM is less than or equal to 0.7, and greater than or equal to 0.3.

In accordance with another aspect of the present disclosure, a lithium ion electrochemical system is also provided, the lithium ion electrochemical system includes a cathode, herein the cathode includes the above cathode active material.

Compared with the related art, a rocksalt structure is purposefully introduced into the cathode active material by using the $z\{xLi_2MnO_3*(1-x)LiRO_2\}*(1-z) Li_aR'_{1-a}O_y$, thereby the material may be stabilized within a circulation cycle. Potential oxygen evolution thereof which may happen in a thermal decomposition during circulation process is reduced in the presence of the rocksalt structure in the material. Further, the cathode active material of the present disclosure is capable of, based on the rocksalt structure, reducing cobalt content in the material, thereby meeting requirements of the lithium ion electrochemical system to the cathode active material without relying on cobalt, and controlling formation of a complex structure by using the cobalt content and lithium loading in the final material.

BRIEF DESCRIPTION OF THE DRAWINGS

The description drawings for forming a part of the present application are used for providing further understanding to the present disclosure, schematic embodiments of the present disclosure and description thereof are used for explaining the present disclosure, and not intend to form inappropriate limitation to the present disclosure. In the drawings.

Herein, the above drawings include the following drawing marks:

Cathode current collector 10; Cathode electrode 20; Separator 30; Anode electrode 40; and Anode current collector 50.

DETAILED DESCRIPTION OF THE EMBODIMENTS

It is to be noted that embodiments in the present application and features in the embodiments may be mutually combined in the case without conflict. The present disclosure is explained in detail with reference to the drawings in combination with the embodiments below.

The present application is further described in detail in combination with the specific embodiments below, but these embodiments may not be understood to limit a scope of protection required by the present application.

As described in the background, because a cathode material in a related art contains cobalt, the cost is higher. In allusion to the above problem, research is performed by the inventor of the present disclosure, a cathode active material is provided, and a general formula thereof is as follows: $z\{xLi_2MnO_3*(1-x)LiRO_2\}*(1-z) Li_aR'_{1-a}O_y$, herein R and R' independently include one or more metal ions, an oxidation valence state of the R is $3^+$, and an oxidation valence state of the R' is $2^+$, herein, $0 \leq x \leq 0.25$, $0 < a \leq 0.75$, $0.625 \leq y \leq 1$, $0.75 \leq z < 1$.

Compared with the related art, a rocksalt structure is purposefully introduced into the above cathode active material provided by the present disclosure by using the $z\{xLi_2MnO_3*(1-x)LiRO_2\}*(1-z) Li_aR'_{1-a}O_y$, thereby the material may be stabilized within a circulation cycle. Potential oxygen evolution thereof which may happen in a thermal decomposition during circulation process is reduced in the presence of the rocksalt structure in the material.

In addition, in the related art, the cobalt is added to a lithium ion cathode electrode because it is regarded to be helpful to improve electrical conductivity of the material, it is generally explained that the cobalt is capable of enabling less transition metal to exist in a layered component lithium diffusion plane, thereby stabilizing a structure. However, in view of problems that global cobalt reserves are inadequate and the cost is high, it is necessary to large-scale adopting of electric automobiles by reducing or ideally eliminating the cobalt content in a lithium ion battery cell. The cathode active material $z\{xLi_2MnO_3*(1-x)LiRO_2\}*(1-z) Li_aR'_{1-a}O_y$ provided in the present disclosure is adopted, a cobalt usage amount may be reduced and the rocksalt structure is introduced to stabilize the structure, thereby requirements of a lithium ion electrochemical system to the cathode active material are satisfied without relying on the cobalt.

As an embodiment, R is independently selected from one or more of a group consist of Al, Fe, Nb, Ni, Co and Zr, R' is independently selected from one or more of of a group consist Ni, Mn, Co, Mg, Nb, Fe, Zn, Ti and Cu.

As an embodiment, the $Li_2MnO_3$ is defined as a first phase, the $LiRO_2$ is defined as a second phase, and the $Li_aR'_{1-a}O_y$ is defined as a third phase, total molar content of Mn in the first phase, R in the second phase and R' in the third phase is TM, the R and/or the R' includes an element Co, and a molar content ratio of the element Co and the TM is less than or equal to 0.1. As another embodiment, the molar content ratio of the element Co and the TM is less than 0.1. As another embodiment, the molar content ratio of the element Co and the TM is less than or equal to 0.05. As another embodiment, the molar content ratio of the element Co and the TM is less than 0.05. As another embodiment, the molar content ratio of the element Co and the TM is 0.

As an embodiment, the $Li_2MnO_3$ is defined as the first phase, the $LiRO_2$ is defined as the second phase, and the $Li_aR'_{1-x}O_y$ is defined as the third phase, the total molar content of the Mn in the first phase, the R in the second phase and the R' in the third phase is the TM, a molar content ratio of Li and the TM is greater than or equal to 0.5. As another embodiment, in the cathode active material, the molar content ratio of the element Li and the TM is greater than or equal to 0.75. As another embodiment, in the cathode active material, the molar content ratio of the element Li and the TM is greater than 0.75. As another embodiment, the molar content ratio of the element Li and the TM is less than 1.5, and greater than 1.05. As another embodiment, the molar content ratio of the element Li and the TM is less than or equal to 1.5, and greater than or equal to 1.05.

As an embodiment, the $Li_2MnO_3$ is defined as the first phase, the $LiRO_2$ is defined as the second phase, and the $Li_aR'_{1-a}O_y$ is defined as the third phase, the total molar content of the Mn in the first phase, the R in the second phase and the R' in the third phase is the TM, the R and/or the R' contains an element Ni, and a molar content ratio of the Ni and the TM is less than or equal to 0.85, and greater than or equal to 0.25. As another embodiment, the molar content ratio of the Ni and the TM is less than 0.85, and greater than 0.25. As another embodiment, the molar content ratio of the element Ni and the TM is less than or equal to 0.7, and greater than or equal to 0.3. As another embodiment, Ni/TM is less than 0.7, and greater than 0.3.

Removal of the cobalt content form the cathode active material increases the occurrence of the $Li_aM'_{1-a}O_y$ compound. While the $Li_aM'_{1-a}O_y$ compound is observed by using modes of Transmission Electron Microscope (TEM) or Scanning Transmission Electron Microscope (STEM) and the like, it is not observed that the compound has clear lithium transition metal ordering.

While the Ni content in the above cathode active material is improved, it may be caused that the Mn content is correspondingly reduced. Long-distance Li—Mn ordering required by the $Li_2MnO_3$ is difficult to be formed because of reduction of the Mn. However, if non-homogeneous distribution of the transition metal is caused by a synthetic method, some $Li_2MnO_3$ may be still formed as a dilute phase, and at least one transition metal is rich-contained and lean-contained in partial regions in the material because of the non-homogeneous distribution. The type of the transition metal with non-homogeneous concentration may be random, all possible synthetic routes of the synthetic method, such as co-precipitation, solid-state synthesis, sol-gel and spray-drying, may also affect non-homogeneity in the transition metal distribution within the material. It is to be noted that other ways may also be used for making the above cathode active material of the present disclosure besides the above ways.

A most common method for preparing a precursor of the above cathode active material is to use the co-precipitation between metal cation salt with at least slightly acidity and solid precipitation alkali formed in an acid-base neutralization reaction.

The starting cation salt may have an anion that is at least one of a sulfate radical, a nitrate radical, a chloride ion, a fluorine ion, a bromide ion and an acetic acid radical. While dissolved in water solution, the concentration of the cation salt is preferably between 0 and 6M (0-6 mol/L), a mixture of nickel, manganese, cobalt, aluminum, titanium or any other metal in a required final compound may be adopted.

The selected base for precipitation may be selected from at least one of sodium hydroxide, potassium hydroxide, lithium hydroxide, sodium carbonate, sodium oxalate, sodium citrate and ammonium hydroxide. The concentration of base solution is 0-14M (0-14 mol/L), and a required final solid co-precipitation product is formed generally by feeding in a proportion approximate to a stoichiometric ratio.

In a coprecipitation reaction, a chelation species may be added into solution, a typical chelation agent includes but not limited to at least one of aqua ammonia, ammonia sulfate, ammonium acetate, ammonium oxalate, ammonium nitrate and quaternary ammonium salts. The coprecipitation reaction may be done under an inert atmosphere, such as nitrogen, so that the solid formed in the co-precipitation reaction process may not generate oxidation.

As an embodiment, the coprecipitation reaction is occurs in a stirring vessel with temperature between 10-120 DEG C., as an embodiment, a temperature range is 40-90 DEG C., and as another embodiment, the temperature range is 45-60 DEG C.

Through the coprecipitation process, the solid product may be formed by a batch reaction, a semi-batch reaction or a continuous reaction. Generally, good mixing of transition metal cations solutions and reactive base may be ensured through mechanical agitation in a certain mode. Mechanical mixing is not necessary, if the mechanical mixing is not adopted, particles may be made by using a precipitation reactor capable of generating fluid momentum (for example an impinging jet).

The prepared co-precipitated particles are a precursor for preparing the final cathode active material. The above precursor may be granular, some or all precursor particles may be particles with uniform concentration or a concentration gradient. A concentration change of a cation ratio in secondary particles may be gradual or abrupt, for example a cation in the secondary particles may be nickel, cobalt and manganese, in a preparation process, an atom molar ratio of the nickel, the cobalt and the manganese is gradually changed or abruptly changed along with reaction time. In certain iterations, a location of the cobalt may be concentrated in the interior of the precursor particles. In some iterations, the location of the cobalt may be concentrated towards the surface of the precursor particle. In some iterations, the cobalt content may be constant through the precursor particles. While the particles with the concentration gradient are prepared, the concentration of the local cobalt (or other transition metal) is not limited only if a nominal composition ratio is in comply with range limitation defined by the above general formula.

After the coprecipitation process, a co-precipitated substance needs to be dried generally, so that the cathode active material precursor may be obtained, and the process may include the following steps: the collected co-precipitated substance is collected from reactor solution through filtering, and any residual soluble salt is removed preferably by using a lot of water for washing; and the coprecipitation substance is dried for 1-2400 minutes in 70-500 DEG C. in a vacuum, inert or air atmosphere, herein a drying temperature may be 100-300 DEG C. In a drying process, some co-precipitated substances may undergo reaction to form partial or complete metal oxides.

Another conceived way to prepare the cathode active material precursor is through a solid state reaction of metal oxide ores. These ores include but not limited to: NiO, $NiCo_2O_4$, $Co_3O_4$, $CoNi_2O_4$, $NiMnO_3$, MnO, CoO, $CoMn_2O_4$, $MnO_2$ and/or $Mn_2O_3$.

In the above process of preparing the cathode active material precursor by using the metal oxide ores, the ores may be ground together through mechanical crushing and milling (for example a ball mill), and calcined in 500-12000 DEG C., so that metal composition are assisted to be more evenly mixed through a mixture. The required precursor may be obtained by ground and calcined the metal oxide ores for many times.

The required precursor is prepared, and mixed with at least one of the following lithium sources: LiOH, $Li_2CO_3$, lithium acetate, lithium sulfate, $Li_2O$, $Li_2O_2$, lithium oxalate, lithium citrate, lithium foil, lithium chloride, lithium bromide and lithium fluoride. A required atomic ratio is the same as the content of the metal in the precursor; and this type of the mixed solid is calcined together so as to form the above cathode active material of the present disclosure.

As an embodiment, the precursor and the lithium source mixture are calcined in multiple steps. The first step may be performed for 1 to 48 hours between 400 and 700 DEG C., preferably less than 24 hours.

In order to introduce a rocksalt component into a structure, the above calcination may be performed in 600-900 DEG C., and over a period of 1 to 48 hours, preferably from 5 to 24 hours. The atmosphere of the calcination may be air and/or oxygen.

The presence of a rocksalt portion of the structure may be observed via XRD, particularly the consolidation of the (018) and (110) peaks into a single peak. With Cu kα radiation these two layered planes are located near ~65 2θ (2-Theta scale). If the material is $LiRO_2$ of a layered structure or a complex structure of $Li_2MnO_3$*$LiRO_2$, a (hkl) peak may present.

STEM may be used for analyzing an occupation ratio of the lithium and the transition metal, thereby it is determined whether the $Li_2MnO_3$ exists in the material. While the $Li_2MnO_3$ is existent, clear ordering of the Li in the transition metal may be observed by using the STEM. A half-cell test may also be performed on the active material by using an electrochemical reaction sensitivity method which is superior to most spectrums of XRD or XAS and the like. Within a cycle of the electrochemical test, a half-cell with a lithium metal cathode may be charged to 4.6 V in a low speed. Within a cycle of dQ/dV analysis, a redox peak at 4.5V is associated with $Li_2MnO_3$ like domains being present in the material.

While the cobalt in the active material is removed or reduced, and nickel content is improved, the rocksalt structure may be formed; while Ni/TM is greater than 0.25, and Co/TM is less than 0.05, the rocksalt structure is more easily formed. It is well-known that $Ni^{3+}$ and $Ni^{4+}$ are more unstable in the lithium ion layered cathode, and may generate a more severe oxidation reaction during synthesis. During the oxidation, $Ni^{2+}$ is formed through using a more stable NiO structure. While greater levels of Mn are present, the Ni is stabilized frequently by forming a $Ni^{2+}/Mn^{4+}$ couple within the structure, and it is helpful to improve stability of the active material. In the existing technology, the cobalt is added to the lithium ion cathode because it is regarded to be helpful to improve the electrical conductivity of the material, it is generally explained that the cobalt is capable of enabling the less transition metal to exist in the layered component lithium diffusion plane, thereby stabilizing the structure.

Each phase existing in the $z\{xLi_2MnO_3*(1-x)LiRO_2\}*(1-z)Li_aR'_{1-a}O_y$ structure may be endowed with some final features. The $LiRO_2$ phase has a 2-d pathway for the lithium ion during intercalation, it is helpful to form pathways for Li in the structure, so that it may reach an active surface and thereby enter electrolyte. At the same time, because disordered rocksalt has a lower molecular weight than the $LiRO_2$, a gram volume of the material is changed. In a thermal decomposition process, the $LiRO_2$ is generally from the layered structure, through an intermediate spinel phase, the rocksalt structure is formed. Because the rocksalt structure has already been a part of the active material, oxygen evolution and exothermic heat release in the thermal decomposition cycle are reduced, thereby the safety may be improved. The $Li_2MnO_3$ phase may generate different effects according to different cycling conditions. If the $Li_2MnO_3$ is not activated through acid leaching or electrochemical oxidation, the phase is used as a pillar in the material, and used for maintaining a $LiRO_2$ 2-d channel during cycling. If the material is activated, the structure is expected to become spinel-like, and the Mn ion is fallen into a lithium layer. While this situation happens, additional capacity may be generated because the lithium ordered in a transition metal layer will be released from the structure.

A method for preparing the above material is not limited to adopt the necessary precursor materials so as to form the final active material structure, but the final active material structure is generally formed through enabling a metal precursor to be mixed with a lithium precursor, and calcining the mixture in a high temperature. The lithium precursor may be metal Li, lithium hydroxide, lithium acetate, lithium carbonate or other lithium containing species that decompose during calcination. The metal precursor may be from grinding of metal oxides, co-precipitation, sol-gel, spray-drying or other preparation technologies.

Formation of the $Li_2MnO_3$ may be affected by the Mn content in the material, and the formation of the $Li_2MnO_3$ may be more apparently affected by a ratio of the lithium to other metal. Once the above ratio is greater than 1, increase of the $Li_2MnO_3$ phase will be caused by continuously increasing the lithium content. A relative ratio of $LiRO_2$ and $Li_aR'_{1-a}O_y$ may be adjusted by changing a temperature in the preparation technology.

The above active material may be used in an electrode of the electrochemical system capable of storing and releasing energy later. Any other compounds in the active material and preparation slurry are casted on a solid or porous substrate, so the active material electrode may be formed. The substrate should be able to conduct electrical current. Other materials in the electrode slurry during casting are suspension solvents, for example NMP or water, a binder and a conductive material (carbon generally), so the heat may be transferred and the current may be conducted through the electrode.

Figure 1:
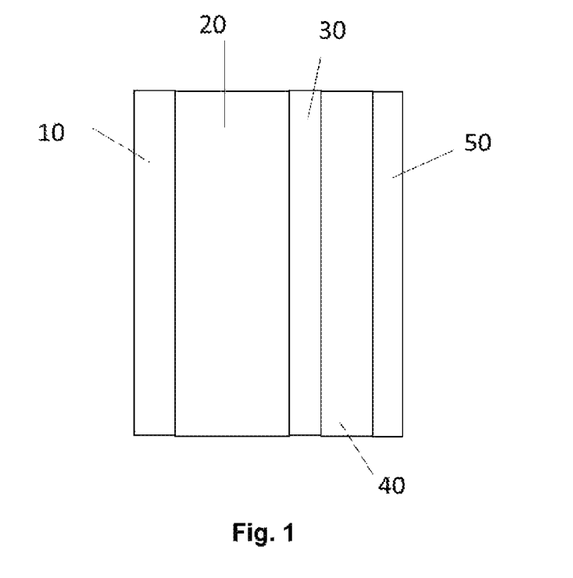
FIG. 1 shows a structure schematic diagram of an electrochemical battery according to an embodiment of the present disclosure.

The electrode prepared by the cathode active material may be used in an electrochemical cell including a cathode electrode, an anode electrode, electrolyte and a separator. As shown in FIG. 1, an electrochemical system includes a cathode current collector 10, a cathode electrode 20, a separator 30, a anode electrode 40 and a anode current collector 50 which are successively laminated and installed. The cell may be further in series or in parallel or in some combination with other cells to form the electrochemical system. The active material electrode may also be used in a multi-pole configuration. The cathode active material for the lithium ion battery may be reversibly circulated between charging and discharging states in a given electrochemical potential.

The present application is further described in detail in combination with the specific embodiments below, and these embodiments may not be understood to limit the scope of protection required by the present application.

Embodiment 1

In 20 L of a reactor, 2 M of metal sulfate solution which is formed by $NiSO_4$, $MnSO_4$ and $CoSO_4$ in a molar ratio 60:35:5 is co-precipitated and 0.1 M of ammonia water with 5 L of an initial volume which is bubbled in a nitrogen can is pumped in 0.5 L/hr of a speed, heated to 500 DEG C. While the metal sulfate is added, 1 M of $Na_2CO_3$ is pumped into the reactor so that a pH is controlled to be about 8, and 9.6 M of ammonia water solution is pumped into the reactor in 0.03 L/hr of a speed. After a metal sulfate solution reactant is completely added to the reactor, in the reactor, a mixture is collected through filtering, and washing is performed by using a lot of water until a filter cake of a metal sulfate is collected. The metal sulfate $Ni_{0.6}Mn_{0.35}Co_{0.05}(CO_3)$ is dried overnight in 100 DEG C. under nitrogen.

In order to prepare an active material, firstly $LiOH \cdot H_2O$ powder is dissolved in ethyl alcohol, the dry carbonate $Ni_{0.6}Mn_{0.35}Co_{0.05}(CO_3)$ is thermal-treated for 6 hours in 600 DEG C., then the powder is added to LiOH/ethanol solution and mixed for 3 hours, and a Li/TM molar ratio is 1.1/1. A mixture is dried in 90 DEG C., and thermal-treated for 10 hours in conditions of 2 DEG C./min of a heating rate and 550 DEG C. of a temperature. The powder is grounded, and thermal-treated for 18 hours in 850 DEG C. The above thermal-treatment is performed in air. According to oxygen content and oxidation state of transition metal, multi-phase solution may be existent, so a prepared material formula is a layered representation method of $Li_{1.1}Ni_{0.6}Mn_{0.35}Co_{0.05}O_k$. It is assumed that $O_k$ is $O_{2.08}$, the material may be represented as $0.85\{0.2Li_2MnO_3*0.8Li(Ni_{0.684}Mn_{0.245}Co\neg_{0.071})O_2\}*0.15Li_{0.25}(Ni)_{0.75}O_{0.875}$.

Embodiment 2

Precursor carbonate is prepared by using a working procedure the same as Embodiment 1, a difference is as follows: a Li/TM molar ratio is 1.2:1. A prepared material formula is $Li_{1.2}Ni_{0.6}Mn_{0.35}CO_{0.05}O_k$, and it is assumed that $O_k$ is $O_{2.14}$, the material may be represented as $0.8\{0.22Li_2MnO_3*0.78Li(Ni_{0.705}Mn_{0.222}Co\neg_{0.072})O_2\}*0.2Li_{0.5}(Ni)_{0.5}O_{0.75}$.

Embodiment 3

Precursor carbonate is prepared by using a working procedure the same as Embodiment 1, a difference is as follows: a feeding ratio of $NiSO_4$, $MnSO_4$ and $CoSO_4$ is 85:13:2, and a mixture after drying is thermal-treated for 18 hours in 2 DEG C./min of a heating rate and 700 DEG C., after that the mixture is cooled in 1 DEG C./min of a cooling rate and grinded. A prepared material formula is $Li_{1.1}Ni_{0.85}Mn_{0.13}Co_{0.02}O_k$, and it is assumed that $O_k$ is $O_{2.08}$, the material may be represented as $0.95\{0.1Li_2MnO_3*0.9Li(Ni_{0.94}Mn_{0.372}Co\neg_{0.022})O_2\}*0.05Li_{0.5}(Ni)_{0.5}O_{0.75}$.

Contrast Example 1

In 2000 L of a reactor, 2 M of metal sulfate solution which is formed by $NiSO_4$, $MnSO_4$ and $CoSO_4$ in a molar ratio 60:20:20 is co-precipitated and 0.8 M of ammonia water with 500 L of an initial volume which is bubbled under a nitrogen tank head can is pumped, heated to 500 DEG C. While a reaction is performed for 24 hours, and the metal sulfate is added, 10.4 M of NaOH is pumped into the reactor so that a pH is controlled to be about 11.5, and 10 M of ammonia water solution is pumped into the reactor. After a metal sulfate solution reactant is completely added to the reactor, in the reactor, a mixture is collected through filtering, and washing is performed by using a lot of water until a filter cake of a metal hydroxide is collected. The metal hydroxide is dried in 100 DEG C. under air.

In order to prepare an active material, the dry metal hydroxide is mixed with $LiOH.H_2O$ in a molar ratio of 1.03:1, and calcined for 5 hours in 500 DEG C., and calcined for 12 hours in 800 DEG C. The material is determined to be a single-phase layered compound by using XRD according to distinct peaks of planes (018) and (110).

Figure 2:
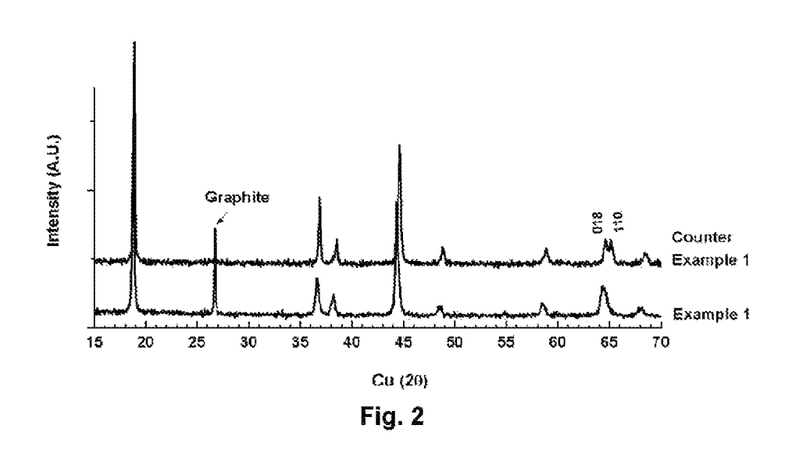
FIG. 2 shows a powder X ray diffraction diagram in Embodiment 1 and Contrast Example 1.
Figure 3:
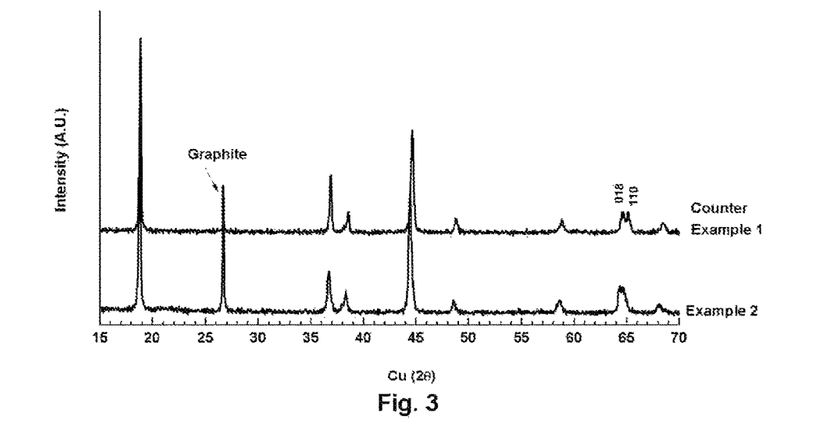
FIG. 3 shows a powder X ray diffraction diagram in Embodiment 2 and Contrast Example 1.
Figure 4:
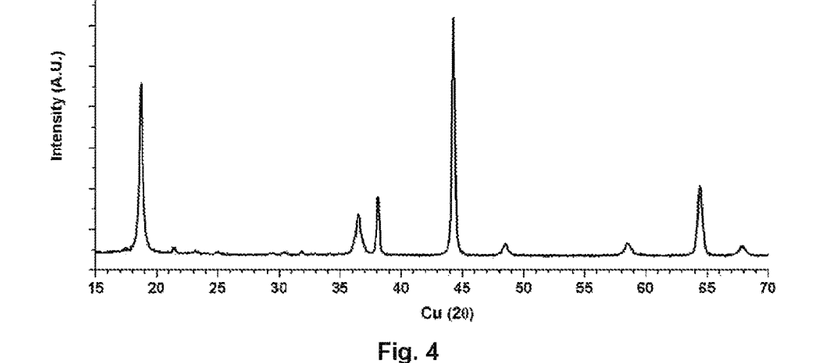
FIG. 4 shows a powder X ray diffraction diagram in Embodiment 3.

X-Ray Diffraction Analysis:

A PAN analysis Empyrean instrument with Cu Kα radiation is used for testing the prepared material. The instrument is provided with a X'Celerator multi-element detector, and capable of collecting data rapidly. An X-ray diffraction spectrum is recorded in 15 to 70 2θ in 0.0330 of increment, and each step is recorded for 0.18 seconds. In a preparation process, some samples are mixed with graphite, so it is ensured that a peak shifts are correctly aligned. The peak near 65 2θ with a Cu Kα ion source is related to ordering of a transition metal layer, and may be used for determining whether a layered phase or a complex phase with disordered rocksalt is existent. An analysis result is as shown in FIG. 2 to FIG. 4, herein, FIG. 2 is a contrast result of selected X-ray diffraction peaks of Embodiment 1 and Contrast Example 1, FIG. 3 is a contrast result of selected X-ray diffraction peaks of Embodiment 2 and Contrast Example 1, FIG. 4 is a powder X-ray diffraction diagram in Embodiment 3, it may be observed from FIG. 2 and FIG. 3 that the powder X-ray diffraction diagram in Contrast Example 1 shows that Li/M disorder is existent rather than an original layered structure. The original layer material has two different peaks near 65 2θ which respectively correspond to planes (108) and (110), but Embodiments 1 to 3 only have one peak in 65 2θ.

Electrochemical preparation and assembly (testing electrochemical performance of a material in coin cells):

90 wt % of an active material, 5.5 wt % of carbon black, 4.5 wt % of PVDF and a suitable additive amount of NMP are used for preparing Slurries. Aluminum foil is coated with the obtained slurry by using a doctor blade coater, and further dried for 30 minutes in 90 DEG C. of an oven. A coated electrode is punched, and 15 mm of the electrode is dried overnight in 85 DEG C. of a vacuum. In order to evaluate the electrochemical performance, a 2025 coin-type half-cell using a lithium metal anode is assembled in a glove box loaded with argon. A layer of a Celgard baffle is installed between a cathode electrode and a anode electrode. Used electrolyte is 1 M of LiPF6 of a vinylene carbonate (VC) additive in ethylene carbonate (EC), diethyl carbonate (DEC) and dimethyl carbonate (DMC) (a volume ratio is 1:1:1). All electrochemical performance tests are performed in 25 DEG C. of an Arbin instrument.

The coin cells with the material in Embodiments 1 and 2 is between 2.2 and 4.6 V (V vs $Li/Li^+$), circulated for 2 cycles at C/20 rate, and circulated by C/10 rate in a [2.7-4.4 V] voltage window (V vs $Li/Li^+$), a testing result is as shown in FIG. 5 to FIG. 12. The coin cells using the material in Embodiment 3 is circulated for two cycles by C/20 rate between 2.4 and 4.6 V (V vs $Li/Li^+$).

Figure 5:
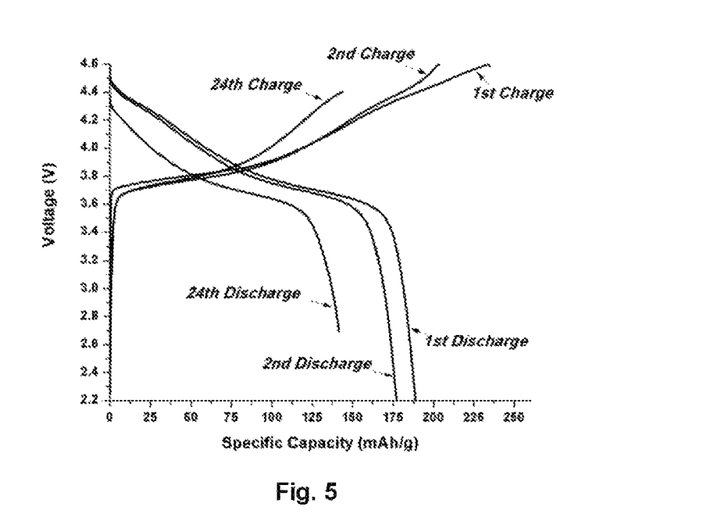
FIG. 5 shows a voltage-specific capacitance relationship curve of Embodiment 1.
Figure 9:
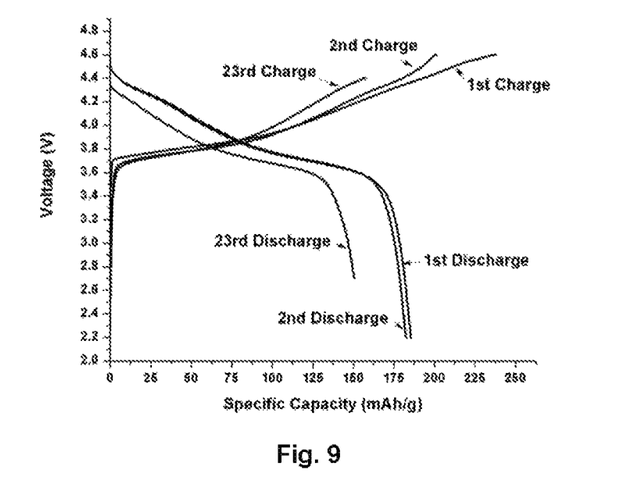
FIG. 9 shows a voltage-specific capacitance relationship curve of Embodiment 2.
Figure 13:
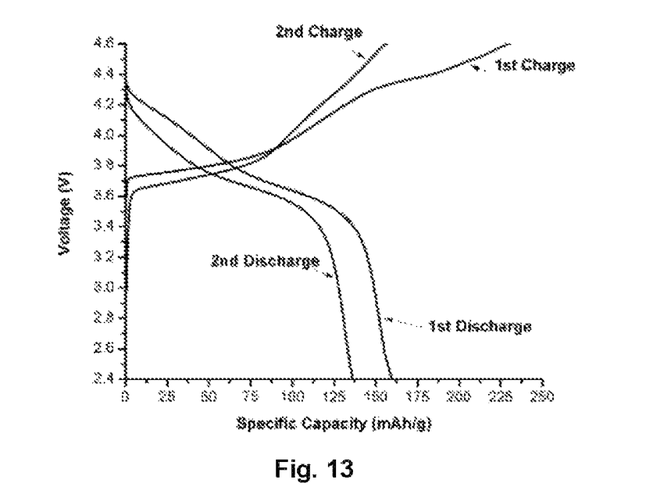
FIG. 13 shows a voltage-specific capacitance relationship curve of Embodiment 3.

Herein, FIG. 5, FIG. 9 and FIG. 13 respectively show the voltage-specific capacitance relationship curves of Embodiments 1 to 3, it may be observed from FIG. 5, FIG. 9 and FIG. 13 that change curves of voltage along with specific capacitance after the coin cells in Embodiments 1 to 3 are circulated and charged for two cycles still show an upward trend, and still show the upward trend especially while the coin cells in Embodiment 1 and Embodiment 2 are respectively circulated and charged for 24 cycles and 23 cycles, thereby it may be observed that the cathode active material in the coin cells is stable.

Figure 6:
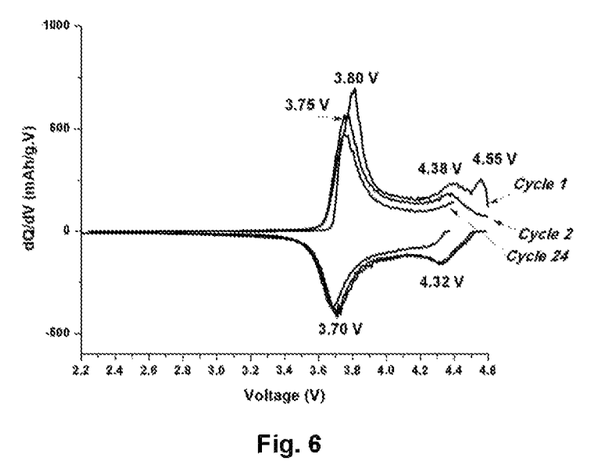
FIG. 6 shows a dQ/dV-V relationship curve of Embodiment 1.
Figure 10:
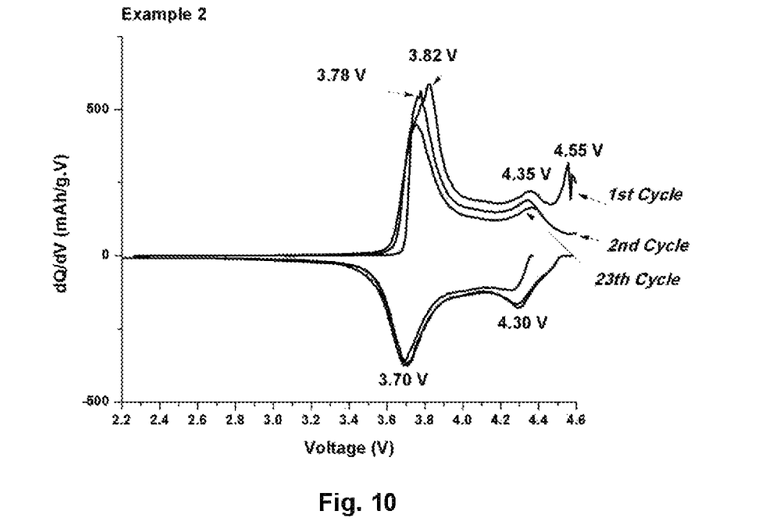
FIG. 10 shows a dQ/dV-V relationship curve of Embodiment 2.
Figure 14:
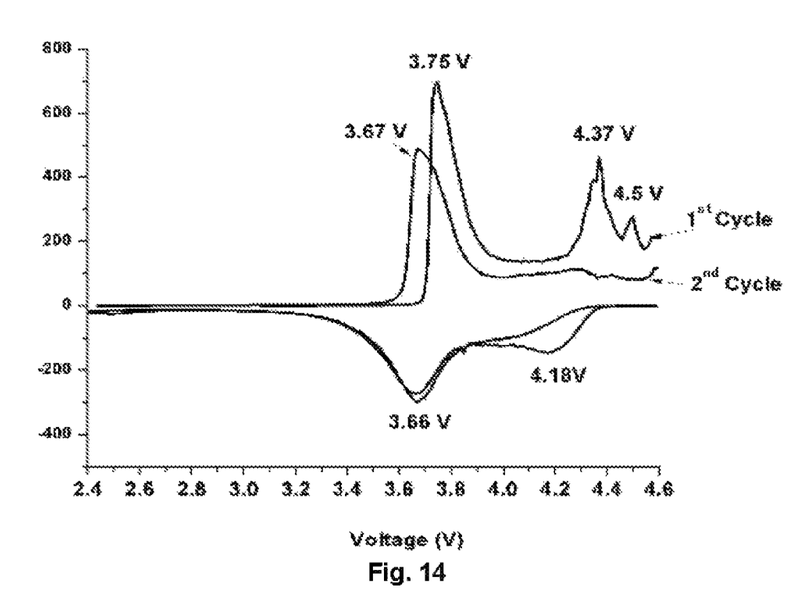
FIG. 14 shows a dQ/dV-V relationship curve of Embodiment 3.

FIG. 6, FIG. 10 and FIG. 14 respectively show the dQ/dV-V relationship curves of Embodiments 1 to 3, it may be observed from FIG. 6, FIG. 10 and FIG. 14 that the battery is charged to 4.6 V in a first circulation according to the button batteries in Embodiments 1 to 3, compared with $Li/Li^+$, an oxidation peak is existent in 4.5 V, and because the curve is related to the $Li_2MnO_3$ in the oxidation peak of 4.5 V, it is proved that the $Li_2MnO_3$ phase release the oxygen in a first circulation process.

Figure 7:
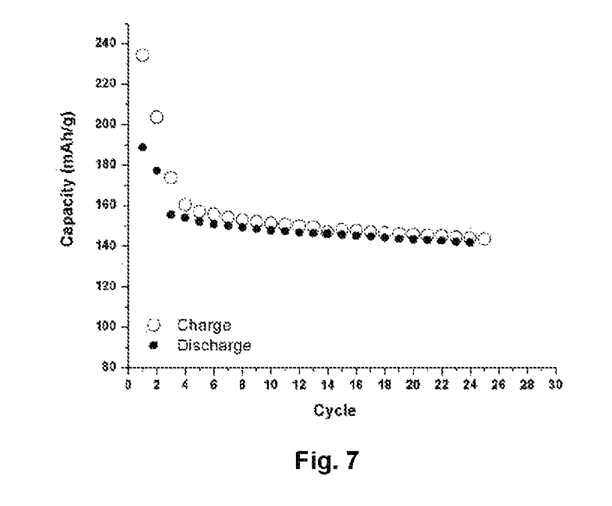
FIG. 7 shows an electrochemical circulation curve diagram of a battery of Embodiment 1.
Figure 11:
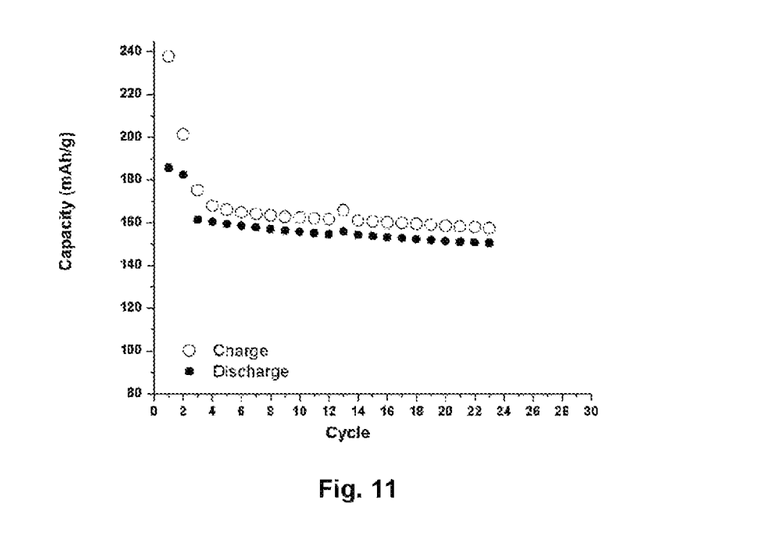
FIG. 11 shows an electrochemical circulation curve diagram of a battery of Embodiment 2.

FIG. 7 and FIG. 11 respectively show the electrochemical circulation curve diagrams (a vertical coordinate is the specific capacity, and a horizontal coordinate is a cycle index) of the batteries of Embodiments 1 and 2, it may be observed from the figures that after dozens of cycles of the circulation, specific capacity fading is slow, thereby it is proved that the stability of the battery is higher.

Figure 8:
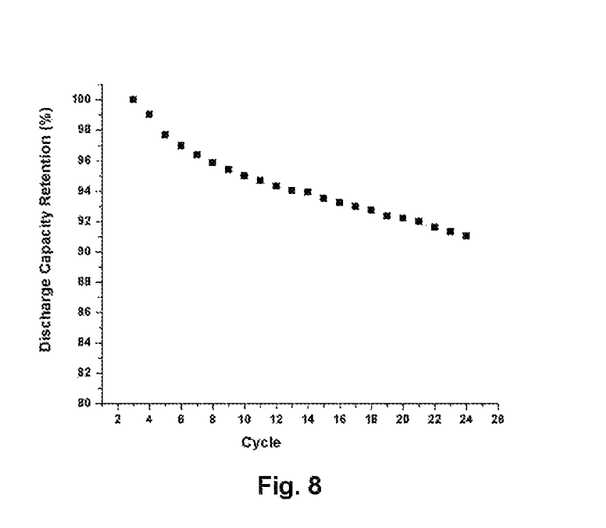
FIG. 8 shows a discharging capacity retention ratio diagram of the battery of Embodiment 1.
Figure 12:
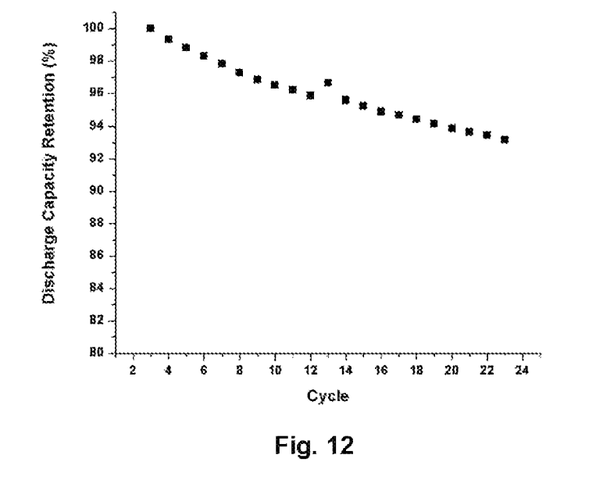
FIG. 12 shows a discharging capacity retention ratio diagram of a battery of Embodiment 2.

FIG. 8 and FIG. 12 respectively show the discharging capacity retention ratio diagrams (a vertical coordinate is the discharging capacity retention ratio, and a horizontal coordinate is the cycle index) of the batteries of Embodiments 1 and 2, it may be observed from the figures that after dozens of cycles of the circulation, discharging capacity retention ratio descending is slow, thereby it may also be proved that the battery has the higher stability.

Oxygen Loss Calculation:

A provided structural formula is considered in a provided condition. At any time, charge of the material must be balanced to be zero; and known lithium and oxygen atoms respectively have +1 and -2 oxidation states. After the charge of the lithium and the oxygen is known, because the charge neutrality must be maintained, an average oxidation state of a metal cation component in the structure may be calculated. In a decomposition process of the lithium metal oxide cathode material, if only the Ni, the Mn and the Co are existent as the metal substances, the metal oxide atom may be reduced to a $2^+$ oxidation state. Therefore, in the cathode material decomposition process, an oxygen loss difference between the average oxidation state of a complex layer-rocksalt material and the $2^+$ oxidation state to which the metal is neutralized is maximum O loss of compound stoichiometry. The discharged material may be calculated, or if the material Li of the present disclosure is extracted to a physical limit value thereof (namely, the cathode is charged in the lithium ion battery), this calculation may be performed. The physical limit is regarded as all Li extracted from the material.

A calculation process of the present application to theoretical released oxygen is as follows:

Calculation precondition: in the $z\{xLi_2MnO_3*(1-x)LiRO_2\}*(1-z)$ $Li_aR'_{1-a}O_y$ of the present application, only the layered structure LiRO2 released oxygen is calculated, so the content of the layered structure is more, the released oxygen is more, an extreme situation is z=1, as the contrast example of the present application, it only has the layered structure, the released oxygen is maximum.

Actual calculation process: the layered structure LiRO2 released oxygen in the $z\{xLi_2MnO_3*(1-x)LiRO_2\}*(1-z)$ $Li_aR'_{1-a}O_y$ is mainly from RO2 to RO, removing of the lithium from the material is also accompanied in a released oxygen process. However, a chemical valence of the lithium and the oxygen is 1:2, therefore, in a process of losing O from $RO_2$ to RO, it is equivalent to remove ½ of the lithium, therefore, a theoretical amount of this time of the released oxygen may be calculated by ½ of the theoretical amount of the removed lithium. In Table 1, the metal represents the content of the metal in the anode material, a release amount of the oxygen (only from the layered structure) according to a removing amount calculation formula of the lithium is as follows: $z*(1-x)/2$, and it represents a half of a total removing amount of the lithium in the layered structure.

The $Li_2MnO_3$ may generate different effects according to different circulation conditions. If the $Li_2MnO_3$ is not activated through acid leaching or electrochemical oxidation, the phase is used as a support in the material, and used for maintaining a $LiRO_2$ 2-d channel in the circulation cycle. If the material is activated, the structure is expected to be changed into a spinel shape, and the Mn ion is fallen into a lithium layer. While this situation happens, an extra volume may be generated because the ordered lithium in a transition metal layer will be released from the structure.

Amounts of oxygen/metal cation (O/M) which may be released while the material is decomposed from a complete charging state in various z, x and a values are compared, as shown in Table 1 and Table 2 (a metal M standardized value is 1 in all calculation processes).

TABLE 1

| z | x | a | Li | M (Mn + R + R') | O | O/M loss required to reach M = 2 + oxidation state |
|---|---|---|---|---|---|---|
| 1.00 | 0.10 |  | 1.10 | 1.00 | 2.10 | 0.45 |
| 0.95 | 0.10 | 0.50 | 1.10 | 1.00 | 2.08 | 0.428 |
| 0.90 | 0.10 | 0.50 | 1.09 | 1.00 | 2.07 | 0.41 |
| 0.85 | 0.10 | 0.50 | 1.09 | 1.00 | 2.05 | 0.38 |
| 0.80 | 0.10 | 0.50 | 1.09 | 1.00 | 2.03 | 0.36 |

TABLE 2

| z | x | a | Li | M (Mn + R + R') | O | O/M loss required to reach M = 2 + oxidation state |
|---|---|---|---|---|---|---|
| 1.00 | 0.30 |  | 1.30 | 1.00 | 2.30 | 0.35 |
| 0.95 | 0.30 | 0.25 | 1.26 | 1.00 | 2.26 | 0.33 |
| 0.90 | 0.30 | 0.25 | 1.23 | 1.00 | 2.21 | 0.32 |
| 0.85 | 0.30 | 0.25 | 1.19 | 1.00 | 2.17 | 0.30 |
| 0.80 | 0.30 | 0.25 | 1.15 | 1.00 | 2.12 | 0.28 |

It may be observed from the above table that the amount of the released oxygen/metal cation (O/M) is also reduced gradually along with gradual reduction of z, therefore, compared with the contrast example (z=1), the cathode active material in the present application is capable of realizing the less oxygen release.

It may be observed from the above description that the above embodiment of the present disclosure realizes the following technical effects.

1. Compared with an existing technology, a rocksalt structure is purposefully introduced into the above cathode active material provided by the present disclosure by using the $z\{xLi_2MnO_3*(1-x)LiRO_2\}*(1-z)$ $Li_aR'_{1-a}O_y$, thereby the material may be stabilized within a circulation cycle. Potential oxygen evolution thereof which may happen in a thermal decomposition process during circulation process is reduced in the presence of the rocksalt structure in the material.

2. The cathode active material $z\{xLi_2MnO_3*(1-x)LiRO_2\}*(1-z)$ $Li_aR'_{1-a}O_y$ provided in the present disclosure may be used for introducing the rocksalt structure to stabilize the structure while reducing cobalt content, thereby meeting requirements of the lithium ion electrochemical system to the cathode active material without relying on cobalt.

The above are only preferable embodiments of the present disclosure, and do not intend to limit the present disclosure, various modifications and changes may be made to the present disclosure by those skilled in the art. Within spirits and principles of the present disclosure, any made modifications equivalent replacements, improvements and the like shall fall within a scope of protection of the present disclosure.

What is claimed is:

1. A cathode active material, wherein a structure general formula of the cathode active material is as follows:

wherein R and R' independently comprise one or more metal ions, an oxidation valence state of the R is $3^+$, and an oxidation valence state of the R' is $2^{30}$, wherein, $0 \leq x \leq 0.25$, $0 < a \leq 0.75$, $0.625 \leq y \leq 1$, $0.75 \leq z < 1$, a rocksalt structure is purposefully introduced into the cathode active material by using the $z\{xLi_2MnO_3*(1-x)LiRO_2\}*(1-z)$ $Li_aR'_{1-a}O_y$.

2. The cathode active material as claimed in claim 1, wherein the R is independently selected from one or more of a group consist of Al, Fe, Nb, Ni, Co and Zr, the R' is independently selected from one or more of a group consist of Ni, Mn, Co, Mg, Nb, Fe, Zn, Ti and Cu.

3. The cathode active material as claimed in claim 1, wherein the $Li_2MnO_3$ is defined as a first phase, the $LiRO_2$ is defined as a second phase, and the $Li_aR'_{1-a}O_y$ is defined as a third phase, total molar content of Mn in the first phase, R in the second phase and R' in the third phase is TM, the R and/or the R' comprises an element Co, and a molar content ratio of the element Co and the TM is less than or equal to 0.1.

4. The cathode active material as claimed in claim 3, wherein the molar content ratio of the element Co and the TM is less than or equal to 0.05.

5. The cathode active material as claimed in claim 1, wherein the $Li_2MnO_3$ is defined as a first phase, the $LiRO_2$ is defined as a second phase, and the $Li_aR'_{1-a}O_y$ is defined as a third phase, the total molar content of the Mn in the first phase, the R in the second phase and the R' in the third phase is a TM, in the cathode active material, a molar content ratio of an element Li and the TM is greater than or equal to 0.75.

6. The cathode active material as claimed in claim 5, wherein the molar content ratio of the element Li and the TM is less than or equal to 1.5, and greater than or equal to 1.05.

7. The cathode active material as claimed in claim 1, wherein the $Li_2MnO_3$ is defined as a first phase, the $LiRO_2$ is defined as a second phase, and the $Li_aR'_{1-a}O_y$ is defined as a third phase, the total molar content of the Mn in the first phase, the R in the second phase, and the R' in the third phase is a TM, the R and/or the R' contains an element Ni, and a molar content ratio of the Ni and the TM is less than or equal to 0.85, and greater than or equal to 0.25.

8. The cathode active material as claimed in claim 1, wherein the molar content ratio of the element Ni and the TM is less than or equal to 0.7, and greater than or equal to 0.3.

9. A lithium ion electrochemical system, comprising a battery, the battery has a cathode electrode, wherein the cathode electrode comprises the cathode active material as claimed in claim 1.

10. The cathode active material as claimed in claim 2, wherein the R is independently selected from one or more of a group consist of Al, Fe, Nb, Ni and Zr, the R' is independently selected from one or more of a group consist of Ni, Mn, Mg, Nb, Fe, Zn, Ti and Cu.

\* \* \* \* \*